July 18, 1933.  E. W. M. BAILEY  1,918,444
WINDOW GLASS GUIDE
Filed July 3, 1930
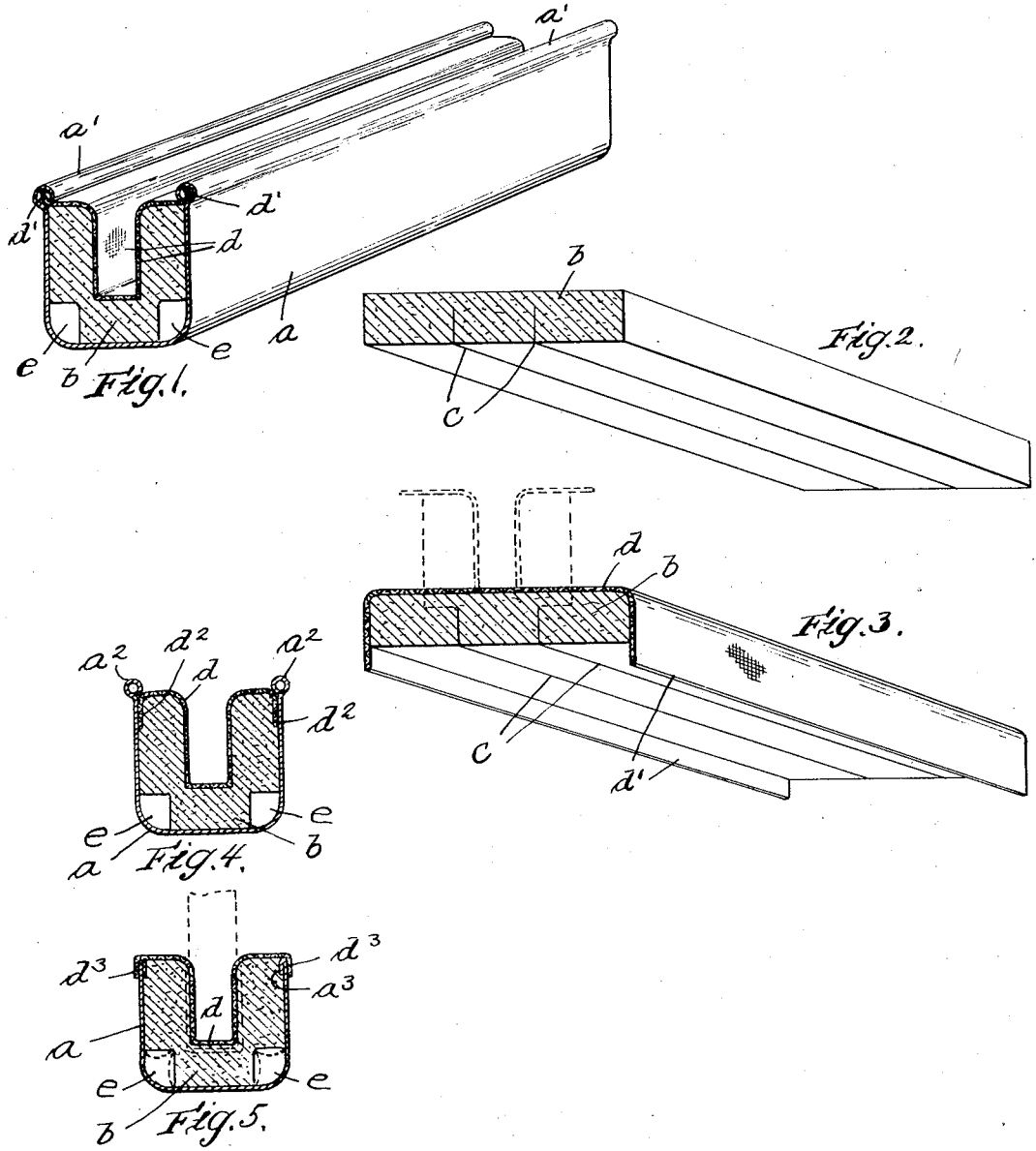
Inventor,
Edwin W. M. Bailey,
by L. H. Terriman
Atty.

Patented July 18, 1933

1,918,444

UNITED STATES PATENT OFFICE

EDWIN W. M. BAILEY, OF AMESBURY, MASSACHUSETTS, ASSIGNOR TO EDWIN M. BAILEY, OF AMESBURY, MASSACHUSETTS

WINDOW GLASS GUIDE

Application filed July 3, 1930. Serial No. 465,551.

This invention relates to window glass guides of the general type employed in closed body automobiles and more particularly to the type in which a metal channel is lined with cushioning material.

While felt has probably been more generally employed as a cushioning lining for this purpose than any other material, it is not entirely satisfactory for the purpose, as it is likely to be affected by moisture, so that it sticks to the glass and is liable to become crowded into bunches, so that movement of the glass is impeded. Also, it is likely to become matted, so that it does not have the desired cushioning effect, and holds the glass loosely, and, if the glass is not graded as to thickness, the resiliency of the felt is, in many instances, insufficient to compensate for the variations in the thickness.

While molded rubber channels have been employed in connection with window glass guides, the force of frictional engagement of glass with rubber is objectionably great and molded rubber is likely to deteriorate, so that it loses its resiliency.

The objects of my invention are to provide a form window glass guide which will effectively cushion the glass and provide a guide which will enable the glass to slide therein without objectionable frictional engagement when wet, as well as under normal conditions, and which will enable glass plates to be used which are of either slightly abnormal thickness or width.

I accomplish these objects by means of the construction hereinafter described and as illustrated in the accompanying drawing, in which:

Fig. 1 is a combined sectional and perspective view of a preferred form of window glass guide embodying the invention.

Figs. 2 and 3 are views of the channel lining means which are employed.

Figs. 4 and 5 are cross sectional views illustrating somewhat modified forms of the invention.

As shown in the drawing, a U-form metal channel $a$ is provided, the sides of which are approximately perpendicular to the bottom and are connected by intermediate curved portions, as customary. The channel is provided with a cushioning lining $b$ of sponge rubber, which is prepared for insertion in the channel by providing a sheet thereof in strip form, of a width corresponding to the combined widths of the sides and bottom of the channel. Two slits $c$ are formed in one side of the strip $b$, which are parallel to its side edges and are located at equal distances therefrom corresponding to the width of the flat portions of the sides, the distance between the slits also corresponding to the width of the flat portion of the bottom of the channel. The slits are extended partly through the strip, so that a substantial portion remains unsevered, as shown in Fig. 2. The opposite side of the cushioning strip $b$ from that in which the slits are formed is covered with a sheet of thin, but stout textile material $d$, for example, a thin canvas, which is of sufficient width to cover both the side and edges thereof and to extend for a short distance beyond the edges, as shown at $d'$ in Fig. 3, the canvas sheet being cemented thereto with a water-proof cement. As thus formed the strip is bent in U-form along the lines of the slit, as indicated in dotted lines in Fig. 3, so that angular notches are formed along the lines of the slits and then the strip is placed in the metal channel $a$, so that the strip portion between the slits is seated on the bottom of the channel and the portions between the slits and edges are engaged with its sides. The contacting surfaces will, preferably, be cemented together. The edge portion $d'$ of the textile covering may be secured in various ways, to give the whole guide a finished appearance, a preferred form being shown in Fig. 1, in which the edge portions of the channel are rolled inward to form a bead $a'$, and the edge portion $d'$ of the covering is inserted within the bead thus formed and clamped between the edge of the side and its inner surface.

As shown in Fig. 4, the edge portions of the covering $d$ may also be bent down onto the outer sides of the cushion and cemented thereto, so that they will be located between the cushion and the sides, as indicated at $d^2$, in which case a cylindrical bead $a^2$ preferably will be formed on each edge of the sides of the channel.

Another form of the invention is shown in Fig. 5, in which the edges of the channel are turned inward and flattened, to form a thickened edge $a^3$, and the edge portions of the covering are extended over these edges and bent down onto the outer surfaces of the sides of the channel and are cemented thereto, as indicated at $d^3$.

When the cushion $b$ is in position in the channel, the angular spaces formed by slitting the cushion and bending it into U-form will be located at the corners of the channel, forming open spaces $e$ into which the cushioning material may be crowded in case the glass plate which is placed in the groove formed by the cushion and its covering, is wider or thicker than that which the construction is designed to receive.

For example, under ordinary conditions the edge of the glass plate will not seat against the bottom of the groove formed by the cushion, but will be held between the two cushion portions which directly engage the sides of the channel, while the cushion portion which engages its bottom will only function as a cushion under abnormal conditions, as in case of sudden shocks. If, however, the glass plate is so wide that it presses against the bottom of the groove in the cushion, the open spaces $e$ permit the soft cushioning material to spread out into these spaces, as indicated in dotted lines in Fig. 5. The results would be similar if the glass plate were abnormally thick, in which case the cushioning material at the sides of the channel would be crowded to some extent into the spaces $e$, so that the force of the frictional engagement would be somewhat relieved.

As the sheet material of which the cushioning strip $b$ is formed is of substantial thickness and its edges are approximately flush with the edges of the metal channel when in position therein, all possibility of contact of the glass with the metal channel is avoided, and, by extending the textile covering $d$ over the edges of the strip to the edges of the metal channel, and securely attaching its edge portions to the corresponding edge portions thereof, displacement of the covering and cushioning lining is prevented and the entire guide is made to present a finished appearance.

Sponge rubber when employed as a cushioning material in the above described relation is particularly advantageous, as it has a wide range of yieldability, permitting substantial variations in thickness of the glass plate for the same construction, and will effectively protect the glass against shocks which would be likely to cause breakage, and, while this material would be impractical if employed in direct contact with the glass, by providing the textile covering $d$ in connection therewith, all the objections thereto for this purpose are obviated, as the glass will slide readily on the canvas, which has good wearing qualities, and may be lubricated with graphite, or the like, so as to reduce the frictional engagement, and which also will not be seriously affected by moisture.

By arranging the edge portion of the covering in any of the ways disclosed, the entire channel is made to present a finished appearance, and the possibility that the lining of the channel, or any portion thereof, will become dislodged is very remote.

The entire guide, as shown is complete and ready for installation in the groove of a window casing.

I claim:

1. A window glass guide comprising a U-form metal channel, a correspondingly shaped sheet of cushioning material disposed in said channel and engaged with the sides and bottom thereof and a textile covering extending over and conforming to the entire outer surface of said cushion and having its edge portions clamped between reversely bent edge portions of the channel sides.

2. A window glass guide comprising a channel form strip of cushioning material for encasing the edge and adjacent side portions of a sheet of glass, a textile covering disposed on the surface of said strip for direct engagement with the glass and extended over both edges of the strip and a sheet metal support extended at each side of the strip and having beaded portions between opposite portions of which the edges of said covering are clamped.

EDWIN W. M. BAILEY.